US011513249B2

(12) United States Patent
Pate et al.

(10) Patent No.: US 11,513,249 B2
(45) Date of Patent: Nov. 29, 2022

(54) DOWNHOLE ACOUSTIC DEVICE

(71) Applicant: Scientific Drilling International, Inc., Houston, TX (US)

(72) Inventors: Lance Pate, Spring, TX (US); Medhat Mickael, Sugar Land, TX (US)

(73) Assignee: SCIENTIFIC DRILLING INTERNATIONAL, INC., Houston, TX (US)

(*) Notice: Subject to any disclaimer, the term of this patent is extended or adjusted under 35 U.S.C. 154(b) by 21 days.

(21) Appl. No.: 17/038,767

(22) Filed: Sep. 30, 2020

(65) Prior Publication Data

US 2021/0109244 A1     Apr. 15, 2021

Related U.S. Application Data

(60) Provisional application No. 62/914,291, filed on Oct. 11, 2019.

(51) Int. Cl.
*G01V 1/52*     (2006.01)

(52) U.S. Cl.
CPC .......... *G01V 1/52* (2013.01); *G01V 2001/526* (2013.01)

(58) Field of Classification Search
CPC ...... G01V 2001/526; G01V 1/44; G01V 1/52; E21B 47/00; E21B 47/0025; E21B 47/0224; E21B 47/08; E21B 47/085; E21B 47/107; E21B 47/14; E21B 47/16
See application file for complete search history.

(56) References Cited

U.S. PATENT DOCUMENTS

| | | | |
|---|---|---|---|
| 3,190,388 A | * | 6/1965 | Moser ................... G01V 1/523 181/102 |
| 3,191,141 A | | 6/1965 | Schuster |
| 3,191,143 A | | 6/1965 | Pardue |
| 3,271,733 A | | 9/1966 | Cubberly, Jr. |
| 4,850,450 A | | 7/1989 | Hoyle et al. |
| 5,510,582 A | | 4/1996 | Birchak et al. |
| 5,987,385 A | * | 11/1999 | Varsamis ................ E21B 47/18 702/6 |
| 6,820,716 B2 | | 11/2004 | Beimgraben et al. |
| 6,834,743 B2 | * | 12/2004 | Arian ...................... G01V 1/52 181/102 |
| 7,028,806 B2 | | 4/2006 | Dubinsky et al. |
| 7,032,707 B2 | | 4/2006 | Egerev et al. |
| 7,650,963 B2 | | 1/2010 | Beimgraben et al. |

(Continued)

*Primary Examiner* — Franklin D Balseca
(74) *Attorney, Agent, or Firm* — Ewing & Jones, PLLC

(57) ABSTRACT

An apparatus for use in acoustically assessing a wellbore, comprises a tubular body, an acoustic transmitter supported on the body, first and second acoustic receivers supported on the body with the second receiver being farther from the transmitter, wherein at least one of the inner and outer body surfaces includes a helical groove between the acoustic transmitter and the first acoustic receiver and the helical groove is filled with a composite material. The body may include a second helical groove that has the same pitch as the first helical groove and is diametrically opposite the first helical groove and may further include a third helical groove between the first and second receivers. At least one of the grooves may an opening width that is less than the maximum groove width and may have a cross-sectional area that includes a neck. The composite material may comprise tungsten particles in rubber.

39 Claims, 3 Drawing Sheets

(56) References Cited

U.S. PATENT DOCUMENTS

| | | |
|---|---|---|
| 7,984,771 B2 | 7/2011 | Pabon et al. |
| 8,270,251 B2 | 9/2012 | Camwell et al. |
| 9,038,766 B2 | 5/2015 | Abbas et al. |
| 9,448,320 B2 | 9/2016 | Gill et al. |

\* cited by examiner

DOWNHOLE ACOUSTIC DEVICE

CROSS-REFERENCE TO RELATED APPLICATIONS

This application is a non-provisional application which claims priority from U.S. provisional application No. 62/914,291, filed Oct. 11, 2019, which is incorporated by reference herein in its entirety.

TECHNICAL FIELD/FIELD OF THE DISCLOSURE

The present disclosure relates to acoustic well logging and more particularly to an acoustic logging tool that includes apparatus for attenuating the transmission of an acoustic signal through the acoustic logging tool.

BACKGROUND OF THE DISCLOSURE

In the context of drilling for hydrocarbon production, acoustic logging tools may be used to characterize subterranean formations surrounding well bores. Acoustic logging tools operate by transmitting an acoustic signal into a formation from one or more transmitters located at one position on the tool and receiving the acoustic signal with one or more receivers located at a second location on the tool. Properties of the received acoustic signal, such as travel time, frequency, amplitude, and attenuation, are then used to characterize the surrounding formation. For example, the information obtained from sonic logs may be used in well-to-well correlation, determining porosity, determining the mechanical or elastic parameters of the rock, detecting over-pressured formation zones, or enabling the conversion of a seismic time trace to a depth trace from information acquired on the speed of sound in the formations.

Once transmitted, the acoustic signal may travel to the receiver(s) via several paths, including through the fluid in the borehole, through the formation, and through the tool itself. Because only the signal that passes through the formation will contain information of interest, it may be advantageous to distinguish the acoustic signals that have passed through the formation from other arriving signals. One way to do this is to attempt to acoustically isolate the receiver so that undesired signals, sometimes referred to as "tool noise," or "tool mode signal" are suppressed. Noise can interfere with the ability of the tool to render an accurate representation of the acoustic response of the formation. This noise typically consists of vibrations traveling within or on the surface or body of the logging tool. The noise may be a high or low frequency noise and may be the result of the transmitted signal itself or may comprise environmental acoustic events including contact of the logging tool with the wellbore.

In order to reduce the noise detected by the receiver(s), it may be desirable to acoustically isolate the receivers from the transmitters and the rigid body of the tool.

SUMMARY

An apparatus for use in acoustically assessing a wellbore may comprise a tubular body, at least one acoustic transmitter mechanically supported on the body, a first acoustic receiver mechanically supported on the body a first distance from the acoustic transmitter, and a second acoustic receiver mechanically supported on the body a second distance from the acoustic transmitter, the second distance being greater than the first distance. The tubular body may have inner and outer surfaces and at least one of the inner and outer surfaces may include a first helical groove on a first longitudinal portion of the tubular body between the acoustic transmitter and the first acoustic receiver; and the helical groove may be filled with a composite material. The pitch of the first helical groove is not necessarily constant along its length.

The tubular body may include a second helical groove between the acoustic transmitter and the first acoustic receiver and the second helical groove may have the same pitch as the first helical groove and may be diametrically opposite the first helical groove. The second helical groove may have the same longitudinal extent as the first helical groove. At least one of the first and second grooves may have an opening width W, a perimeter P, and a maximum groove width G, and the opening width W may be less than the maximum groove width G. At least one of the first and second grooves may have a cross-sectional area that may include a neck.

The tubular body may include a third helical groove on a second longitudinal portion of the tubular body between the first and second acoustic receivers. At least one of the first, second, and third grooves may have a non-circular cross-section. At least one of the first, second, and third grooves may have a non-uniform cross-section along its length and may have a cross-sectional area that may include a neck. The first and third helical grooves may have different pitches. The pitch of the third helical groove may be non-constant and two or more cycles of the third helical groove may pass between each pair of adjacent receivers.

The apparatus may further include a hardfacing material adjacent to one edge of at least one helical groove. The hardfacing material may comprise a stainless steel matrix containing a tungsten carbide aggregate. The composite material in one or more grooves may comprise solid particles in an elastomer. The composite material in one or more grooves may comprise tungsten particles in rubber.

In each portion of the tool body, the fraction of the tool body wall volume that is occupied by grooves may be less than 20% and may be between 5% and 15%. The first helical groove has a cycle length that is less than the distance between the acoustic transmitter and the first acoustic receiver.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. As used herein, the "pitch" of a helix is the distance between any two points on the helix that are exactly 1 turn apart, measured parallel to the axis of the helix.

Figure 1:
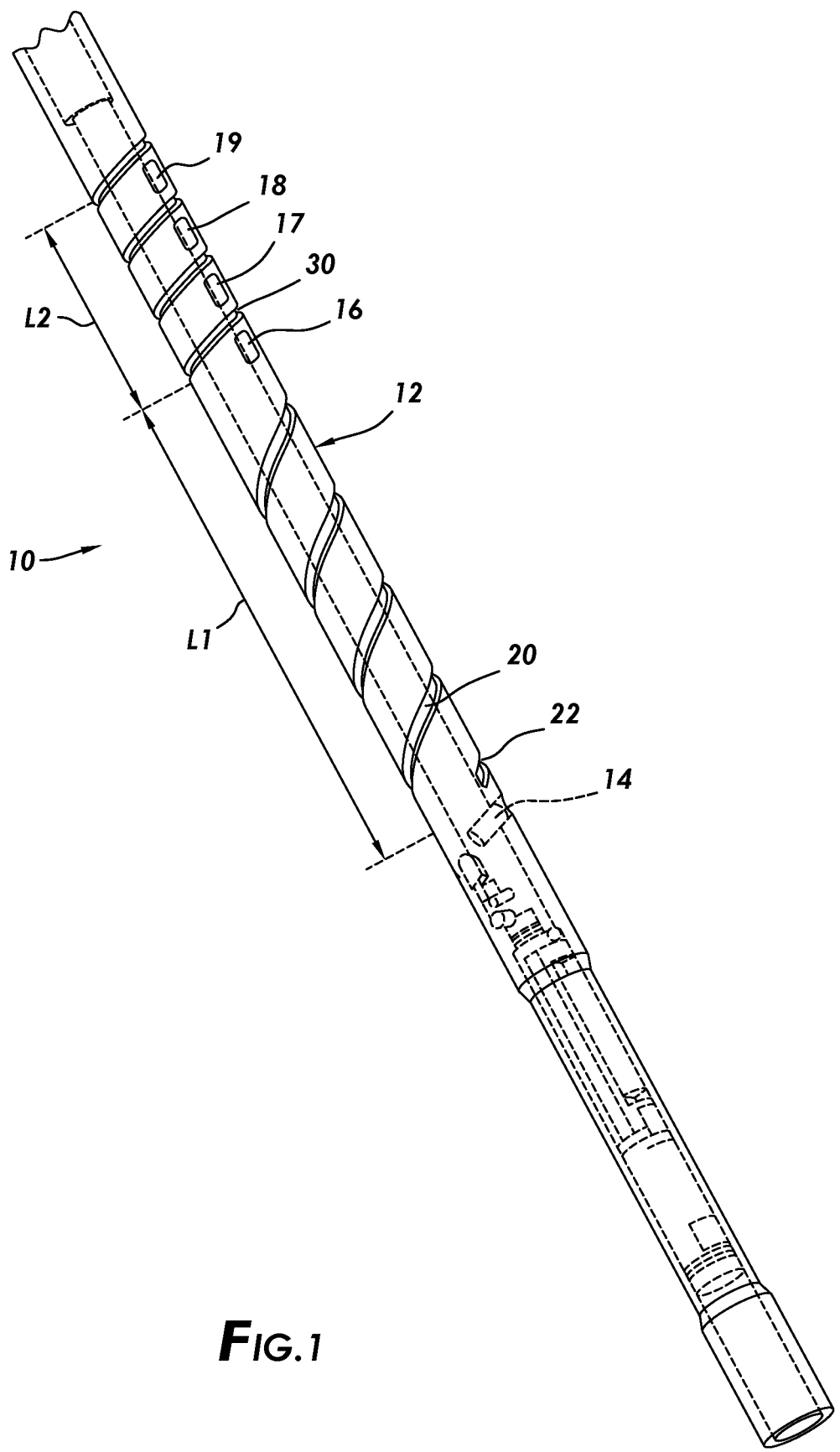
FIG. 1 is an oblique view of a tool in accordance with an embodiment of the invention.

Referring initially to FIG. 1, an acoustic tool 10 for acoustically assessing a wellbore may comprise a tubular body 12, at least one acoustic transmitter 14 mechanically supported on the body, and at least a first acoustic receiver 16 mechanically supported on the body a first distance from the acoustic transmitter. Tubular body 12 has inner and outer surfaces and at least one of the inner and outer surfaces may include a first helical groove on a first longitudinal portion of the tubular body between the acoustic transmitter and the first acoustic receiver, herein after referred to as D1. First acoustic receiver 16 and any other receiver discussed herein may be housed in a pocket in tool body 12.

It has been found that the pitch and groove profile geometry of a helical groove may be constrained by three operating parameters that are often associated with drilling tools, namely: tool mode attenuation, dogleg severity capability, and torsional load capacity. Maximizing each of these operating parameters will provide the most accurate and robust design.

Dogleg severity (DLS) is a normalized estimation, normally described in degrees per 100 feet or degrees per 30 meters, of the overall well bore curvature between two consecutive directional surveys. Regarding a planned well path, dogleg severity may be synonymous with build and/or turn. The following formula provides dogleg severity in degrees/100 ft based on the Radius of Curvature Method:

$$DLS=(\cos^{-1}[(\cos I_1 \times \cos I_2)+(\sin I_1 \times \sin I_2)\times \cos(Az_2-Az_1)])\times(100/MD)$$

where:
DLS=dogleg severity in degrees/100 ft
MD=Measured Depth between survey points (ft)
$I_1$=inclination (angle) at upper survey in degrees
$I_2$=inclination (angle) at lower in degrees
$Az_1$=Azimuth direction at upper survey
$Az_2$=Azimuth direction at lower survey A baseline tool mode attenuation level (TM) may be achieved using a first helical groove having a constant helical pitch P. For a given pipe specification, each combination of groove profile geometry and pitch will result in a baseline dogleg severity capability and torque capacity. It has been found that tool mode attenuation can be approximately doubled, to 2*TM, by reducing the constant helical pitch to P/2 and maintaining the same groove profile. However, reducing the pitch to P/2 reduces torque capacity by approximately 40%, and reduces dogleg severity capability by approximately 12%.

An alternate approach to achieving comparable tool mode attenuation improvement, i.e., approximately doubling TM, is to incorporate a second helix that is diametrically opposed to the first helix. Both helixes may have the same helical pitch P and the same cross-sectional profile. This design distributes the bending stresses and provides a dogleg severity capability improvement of approximately 25%, while maintaining approximately the same torsional capacity. The present approach provides tool mode attenuation improvements, while also increasing dogleg severity capability. These are significant operational advantages over conventional helical groove isolator designs.

Thus, referring still to FIG. 1, in the illustrated embodiment, a first helical groove 20 extends around body 12 between transmitter 14 and first acoustic receiver 16. First helical groove 20 may extend the full length of L1. In the illustrated embodiment, a second helical groove 22 also extends around body 12 between transmitter 14 and first acoustic receiver 16. Second helical groove 22 may be diametrically opposed to first helical groove 20, as shown, or not, and may likewise extend along the full length of L1 or a portion thereof. In some embodiments, the pitch of first helical groove 20 may be selected such that first helical groove 20 completes a fraction of a cycle or at least a full cycle in L1. In some embodiments, the pitch of first helical groove 20 and second helical groove 22, if present, may be non-constant.

In the illustrated embodiment, a second acoustic receiver 17 is mechanically supported on tool body 12 a second distance from acoustic transmitter 14, the second distance being greater than the L1. Likewise, third and fourth acoustic receivers 18, 19 may each be mechanically supported on tool body 12 at increasing distances from transmitter 14. The number of receivers does not affect the operability of the concepts described herein. The portion of the length of tool body 12 between first acoustic receiver 16 and the final receiver, receiver 19 as drawn, is hereinafter referred to as L2.

Still referring to FIG. 1, a third helical groove 30 extends around body 12 for all or at least a portion of L2. Third helical groove 30 is configured such that it does not intersect any of the receivers or receiver housings. The pitch of third helical groove 30 may be different from the pitch of first helical groove 20; in some embodiments, the pitch of third helical groove 30 may be selected such that the ratio of the pitch of the third helical groove 30 to the pitch of the first helical groove 20 is at least 1:2 or at least 1:4. In some embodiments, the pitch of third helical groove 30 may be selected such that third helical groove 30 completes at least a fraction of one cycle(s) in L2. In other embodiments, the pitch of third helical groove 30 may be substantially equal to the distance from one receiver to the next receiver, so that a cycle of third helical groove 30 passes between each pair of adjacent receivers, as illustrated. In still other embodiments, the pitch of third helical groove 30 may be nonconstant and/or third helical groove 30 may be configured such that two or more cycles of third helical groove 30 pass between each pair of adjacent receivers.

Third helical groove 30 may be a continuation of first helical groove 20 or second helical groove 22, with a transition at the L1/L2 transition comprising a change of groove pitch. Alternatively, the start of third helical groove 30, i.e. the end closest to first acoustic receiver 16, may be separate from both first and second helical grooves 20, 22.

In some embodiments, one or more of helical grooves 20, 22, 30 may be filled with a composite material. The composite material may comprise solid particles embedded in an elastomer or other embedding material. The solid particles may be substantially smaller than the width of the groove and the solid particles may have a density greater than the density of the elastomer or other embedding material. In some embodiments, the composite material may comprise tungsten particles embedded in natural or synthetic rubber. The elastomer may be a vulcanized rubber.

Figure 2:
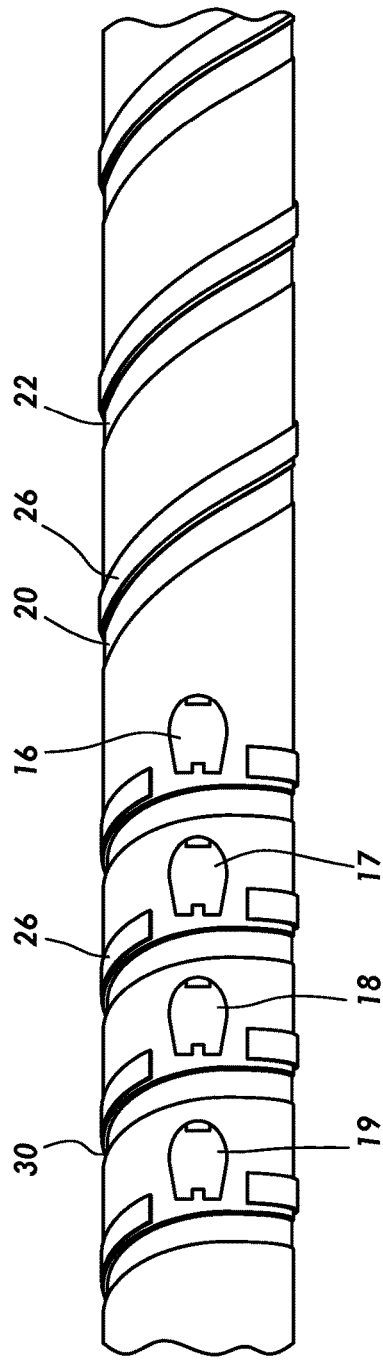
FIG. 2 is an oblique view of a portion of a tool in accordance with an embodiment of the invention.
Figure 3:
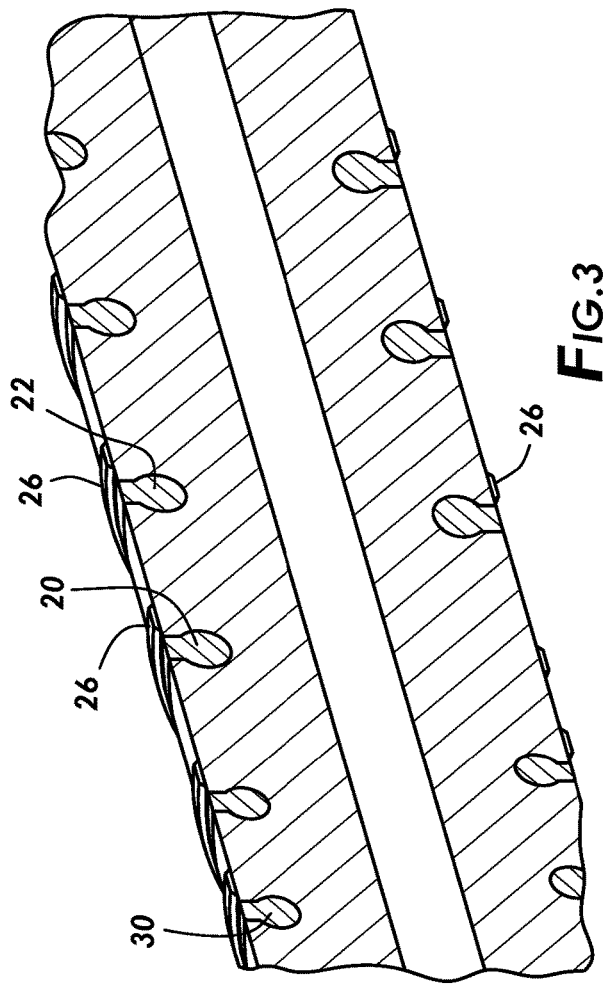
FIG. 3 is an oblique view of a cross-section of a portion of a tool in accordance with an embodiment of the invention.

Referring now to FIGS. 2 and 3, in some embodiments, a hardfacing material 26 may be included on tool body 12 adjacent to at least one edge of at least one helical groove 20, 22, and/or 30. Hardfacing material 26 may be applied to only the down-hole edge of a groove, so as to limit wear on the composite material in the groove as the tool is lowered into a borehole, or may be applied to both edges and/or at points on tool body 12 between adjacent groove cycles. Hardfacing material 26 may be applied as a continuous strip or as a series of buttons and may be embedded in and flush with the outer surface of tool body 12 or affixed to the outer surface of tool body 12. Hardfacing material 26 may comprise stainless steel matrix material containing a tungsten carbide aggregate.

Referring again to FIG. 3, each of helical grooves 20, 22, 30 may have a cross-sectional area. For a groove-having a constant cross-section, the volume of the groove $V_G$ equals the product of the length of the groove and cross-sectional area of the groove. Likewise, if the groove volume is ignored, the tubular body has a body volume $V_B$ that is a function of the length, diameter, and wall thickness of the tubular body. According to some embodiments, in each portion of the tool body the groove pitch and the groove cross-sectional area for any of helical grooves on that portion may be selected such that the fraction of the volume of wall material that is occupied by the groove(s), i.e. the volume that is absent from the tubular body because of the groove(s), is less than 20% and, in some embodiments, between 5% and 20%. Put another way, the ratio of $V_G$ to $V_B$ may be less than 1:5 and may be between and 1:20 and 1:5. The groove geometry, helical pitch, and number of helixes may be selected to provide maximum acoustic attenuation without departing from acceptable limits for mechanical integrity, dogleg severity capability, and torsional load capacity.

Figure 5:
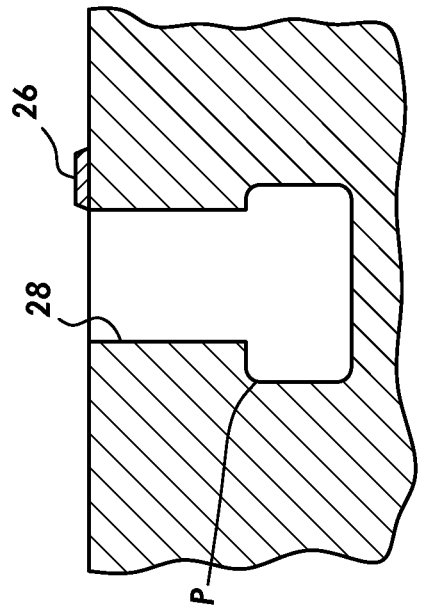
FIGS. 4-6 are schematic cross-sectional illustrations of alternative embodiments of one aspect of the invention.
Figure 4:
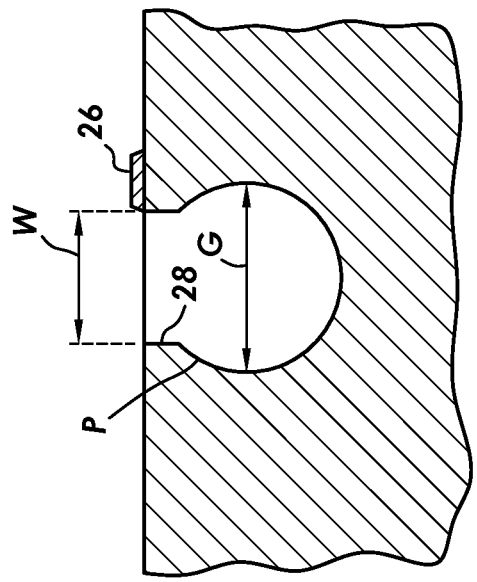

Referring now to FIGS. 4 and 5, in some embodiments, when viewed in cross-section, i.e. transversely to the groove axis, at least one helical groove may have an opening width W, a perimeter P, and a maximum groove width G. In some embodiments, W may be less than the maximum groove width G. In some embodiments, the ratio of W to P may be less than $2/\pi$. While perimeter P is shown as being generally circular in FIG. 4, perimeter P may have any desired shape. For example, perimeter P may have a non-constant curvature and, as illustrated in FIG. 5 need not be symmetrical. Still further, the shape of perimeter P need not be constant along the length of the groove.

Figure 6:
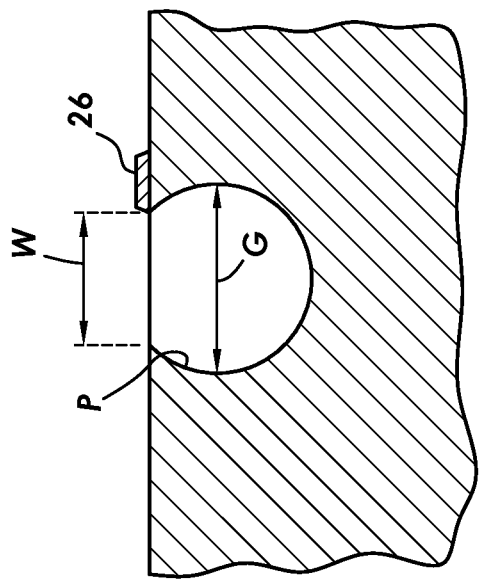

Still referring to FIGS. 4 and 5, in some embodiments, at least one of helical grooves 20, 22, 30 may have a neck 28, or narrower portion, between the outer surface of tool body 12 and the main area of the groove. Neck 28 may have any desired length. Neck 28 may be used as a retaining mechanism for the composite material. Increasing the length of neck 28 may improve acoustic attenuation but may also reduce tool strength. In the embodiment shown in FIG. 6, a generally circular groove has no neck but has an opening width W that is less than the maximum groove width G so as to retain the composite material in the groove.

In some embodiments, instead of making a second, identical groove, the amount of material removed in the first groove may be increased to more than 20% of the volume of the ungrooved tubular body. In some embodiments, second helical groove 22 may not be diametrically opposed to the first groove. In some embodiments, there may be a third groove (not shown) in L1 and first and second helical grooves 20, 22 and the third groove may be evenly spaced around the circumference of the tubular body. In some embodiments, one or more grooves may be longer than a simple helix and may, for example, comprise a "sinusoidal helical groove" (i.e. a sine-wave wrapped in a helical shape).

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

What is claimed is:

1. An apparatus for use in acoustically assessing a wellbore, comprising:
    a tubular body having inner and outer body surfaces;
    at least one acoustic transmitter mechanically supported on the body;
    a first acoustic receiver mechanically supported on the body at a first distance from the acoustic transmitter; and
    a second acoustic receiver mechanically supported on the body at a second distance from the acoustic transmitter, the second distance being greater than the first distance;
    wherein at least one of the inner and outer body surfaces includes a first helical groove on a first longitudinal portion of the tubular body between the acoustic transmitter and the first acoustic receiver;
    wherein the first helical groove is filled with a composite material; and
    wherein at least one of the inner and outer surfaces includes a second helical groove between the acoustic transmitter and the first acoustic receiver, wherein the second helical groove is on the same body surface as the first helical groove and has a second pitch, wherein the second pitch is the same as the first pitch, and wherein the second helical groove is diametrically opposite the first helical groove.

2. The apparatus according to claim 1 wherein each of the first and second helical grooves has a longitudinal extent and the longitudinal extent of the second helical groove is the same as the longitudinal extent of the first helical groove and wherein the second helical groove is filled with a composite material.

3. The apparatus according to claim 1 wherein the tubular body includes a third helical groove on a second longitudinal portion of the tubular body between the first and second acoustic receivers.

4. The apparatus according to claim 3 wherein at least one of the first, second, and third grooves has a non-circular cross-section.

5. The apparatus according to claim 3 wherein at least one of the first, second, and third grooves has a cross-sectional area that includes a neck.

6. The apparatus according to claim 3 wherein the first and third helical grooves have different pitches.

7. The apparatus according to claim 6 wherein the pitch of the third helical groove is non-constant and two or more cycles of the third helical groove pass between each pair of adjacent receivers.

8. The apparatus according to claim 3 wherein the second and third helical grooves are each filled with a composite material.

9. The apparatus according to claim 8 wherein the composite material in each groove comprises solid particles in an elastomer.

10. The apparatus according to claim 8 wherein the composite material comprises tungsten particles in rubber.

11. The apparatus according to claim 3, further including a hardfacing material adjacent to one edge of at least one helical groove.

12. The apparatus according to claim 11 wherein the hardfacing material comprises stainless steel matrix containing a tungsten carbide aggregate.

13. The apparatus according to claim 1 wherein, in each portion of the tubular body, the tubular body has a wall volume, wherein the first and second helical grooves occupy a fraction of the tubular body wall volume, and wherein the fraction of the tubular body wall volume is less than 20%.

14. The apparatus according to claim 1 wherein, in each portion of the tubular body, the tubular body has a wall volume, wherein the first and second helical grooves occupy a fraction of the tubular body wall volume, and wherein the fraction of the tubular body wall volume is between 5% and 15%.

15. The apparatus according to claim 1 wherein the first helical groove has a pitch that is less than the distance between the acoustic transmitter and the first acoustic receiver.

16. An apparatus for use in acoustically assessing a wellbore, comprising:
   a tubular body having inner and outer body surfaces;
   at least one acoustic transmitter mechanically supported on the body;
   a first acoustic receiver mechanically supported on the body at a first distance from the acoustic transmitter; and
   a second acoustic receiver mechanically supported on the body at a second distance from the acoustic transmitter, the second distance being greater than the first distance;
   wherein at least one of the inner and outer body surfaces includes a first helical groove on a first longitudinal portion of the tubular body between the acoustic transmitter and the first acoustic receiver;
   wherein the first helical groove is filled with a composite material;
   wherein at least one of the inner and outer surfaces includes a second helical groove between the acoustic transmitter and the first acoustic receiver, and
   wherein at least one of the first and second grooves has an opening width W and a maximum groove width G, and wherein the opening width W is less than the maximum groove width G.

17. The apparatus according to claim 16 wherein each of the first and second helical grooves has a longitudinal extent and the longitudinal extent of the second helical groove is the same as the longitudinal extent of the first helical groove and wherein the second helical groove is filled with a composite material.

18. The apparatus according to claim 16 wherein the tubular body includes a third helical groove on a second longitudinal portion of the tubular body between the first and second acoustic receivers.

19. The apparatus according to claim 18 wherein at least one of the first, second, and third grooves has a non-circular cross-section.

20. The apparatus according to claim 18 wherein at least one of the first, second, and third grooves has a cross-sectional area that includes a neck.

21. The apparatus according to claim 18 wherein the first and third helical grooves have different pitches.

22. The apparatus according to claim 21 wherein the pitch of the third helical groove is non-constant and two or more cycles of the third helical groove pass between each pair of adjacent receivers.

23. The apparatus according to claim 18 wherein the second and third helical grooves are each filled with a composite material.

24. The apparatus according to claim 18, further including a hardfacing material adjacent to one edge of at least one helical groove.

25. The apparatus according to claim 24 wherein the hardfacing material comprises stainless steel matrix containing a tungsten carbide aggregate.

26. The apparatus according to claim 16 wherein, in each portion of the tubular body, the tubular body has a wall volume, wherein the first and second helical grooves occupy a fraction of the tubular body wall volume, and wherein the fraction of the tubular body wall volume is less than 20%.

27. The apparatus according to claim 16 wherein, in each portion of the tubular body, the tubular body has a wall volume, wherein the first and second helical grooves occupy a fraction of the tubular body wall volume, and wherein the fraction of the tubular body wall volume is between 5% and 15%.

28. An apparatus for use in acoustically assessing a wellbore, comprising:
   a tubular body having inner and outer body surfaces;
   at least one acoustic transmitter mechanically supported on the body;
   a first acoustic receiver mechanically supported on the body at a first distance from the acoustic transmitter; and
   a second acoustic receiver mechanically supported on the body at a second distance from the acoustic transmitter, the second distance being greater than the first distance;
   wherein at least one of the inner and outer body surfaces includes a first helical groove on a first longitudinal portion of the tubular body between the acoustic transmitter and the first acoustic receiver;
   wherein the first helical groove is filled with a composite material;
   wherein at least one of the inner and outer surfaces includes a second helical groove between the acoustic transmitter and the first acoustic receiver, and
   wherein at least one of the first and second grooves has a cross-sectional area that includes a neck.

29. The apparatus according to claim 28 wherein each of the first and second helical grooves has a longitudinal extent and the longitudinal extent of the second helical groove is the same as the longitudinal extent of the first helical groove and wherein the second helical groove is filled with a composite material.

30. The apparatus according to claim 28 wherein the tubular body includes a third helical groove on a second longitudinal portion of the tubular body between the first and second acoustic receivers.

31. The apparatus according to claim 30 wherein at least one of the first, second, and third grooves has a non-circular cross-section.

32. The apparatus according to claim 30 wherein at least one of the first, second, and third grooves has a cross-sectional area that includes a neck.

33. The apparatus according to claim 30 wherein the first and third helical grooves have different pitches.

34. The apparatus according to claim 33 wherein the pitch of the third helical groove is non-constant and two or more cycles of the third helical groove pass between each pair of adjacent receivers.

35. The apparatus according to claim 30 wherein the second and third helical grooves are each filled with a composite material.

36. The apparatus according to claim 30, further including a hardfacing material adjacent to one edge of at least one helical groove.

37. The apparatus according to claim 36 wherein the hardfacing material comprises stainless steel matrix containing a tungsten carbide aggregate.

38. The apparatus according to claim 28 wherein, in each portion of the tubular body, the tubular body has a wall volume, wherein the first and second helical grooves occupy a fraction of the tubular body wall volume, and wherein the fraction of the tubular body wall volume is less than 20%.

39. The apparatus according to claim 28 wherein, in each portion of the tubular body, the tubular body has a wall volume, wherein the first and second helical grooves occupy a fraction of the tubular body wall volume, and wherein the fraction of the tubular body wall volume is between 5% and 15%.

\* \* \* \* \*